(12) United States Patent
Quinta Cortiñas et al.

(10) Patent No.: US 7,650,856 B2
(45) Date of Patent: Jan. 26, 2010

(54) SUBMERSIBLE FARM

(76) Inventors: Andres Quinta Cortiñas, Campaña, Apartado 51, E-36645 Valga, Pontevedra (ES); Eladio Diaz Arbones, Campaña, Apartado 51, E-36645 Valga, Pontevedra (ES)

( * ) Notice: Subject to any disclaimer, the term of this patent is extended or adjusted under 35 U.S.C. 154(b) by 233 days.

(21) Appl. No.: 11/659,353

(22) PCT Filed: Jul. 29, 2005

(86) PCT No.: PCT/ES2005/000435

§ 371 (c)(1),
(2), (4) Date: Feb. 5, 2007

(87) PCT Pub. No.: WO2006/030042

PCT Pub. Date: Mar. 23, 2006

(65) Prior Publication Data

US 2008/0029040 A1    Feb. 7, 2008

(30) Foreign Application Priority Data

Aug. 6, 2004    (ES) ............................... 200401977

(51) Int. Cl.
*A01K 61/00* (2006.01)

(52) U.S. Cl. ...................................... 119/223; 119/239

(58) Field of Classification Search ......... 119/238–241, 119/223, 234–236, 204–208, 221, 222
See application file for complete search history.

(56) References Cited

U.S. PATENT DOCUMENTS

| | | | | |
|---|---|---|---|---|
| 2,283,472 A * | 5/1942 | Tuxhorn | ..................... | 119/223 |
| 2,989,945 A * | 6/1961 | Ford | ........................... | 119/240 |
| 4,257,350 A * | 3/1981 | Streichenberger | ........... | 119/223 |
| 5,412,903 A * | 5/1995 | Zemach et al. | ................ | 43/102 |
| 5,845,602 A * | 12/1998 | Kaarstad et al. | ............. | 119/223 |
| 6,216,635 B1 * | 4/2001 | McRobert | ................... | 119/201 |
| 7,341,021 B2 * | 3/2008 | Cortinas et al. | ............. | 119/239 |

FOREIGN PATENT DOCUMENTS

| | | |
|---|---|---|
| GB | 2 302 525 A | 1/1997 |
| SU | 1387937 A1 | 4/1988 |
| WO | WO 87/04319 A1 | 7/1987 |
| WO | WO 89/00004 A1 | 1/1989 |
| WO | WO 8900004 A1 * | 1/1989 |
| WO | WO 2004002221 A1 * | 1/2004 |
| WO | WO 2004004448 A1 * | 1/2004 |
| WO | WO 2007031591 A1 * | 3/2007 |

* cited by examiner

*Primary Examiner*—Rob Swiatek
*Assistant Examiner*—Kristen C Hayes
(74) *Attorney, Agent, or Firm*—Breiner & Breiner, LLC

(57) ABSTRACT

The invention relates to an improved submersible mollusc farm consisting of a self-supporting frame which is formed with an "H" plan floating structure comprising beams with support arms for the culture ropes. According to the invention, the structure moves vertically under the effect of tides or the weight of the culture product and is guided by means of surface floats which are equipped with a guide tube comprising slide stop elements between which the structure can slide.

2 Claims, 1 Drawing Sheet

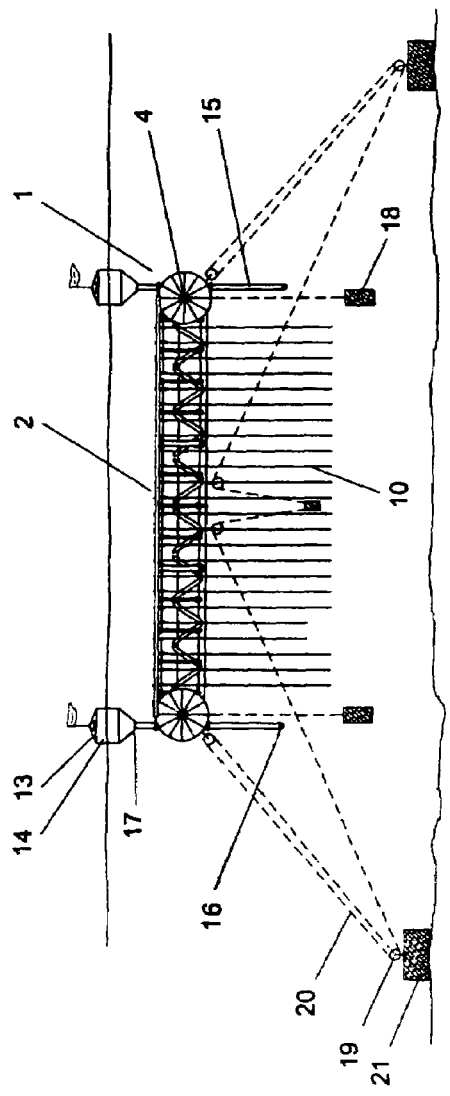
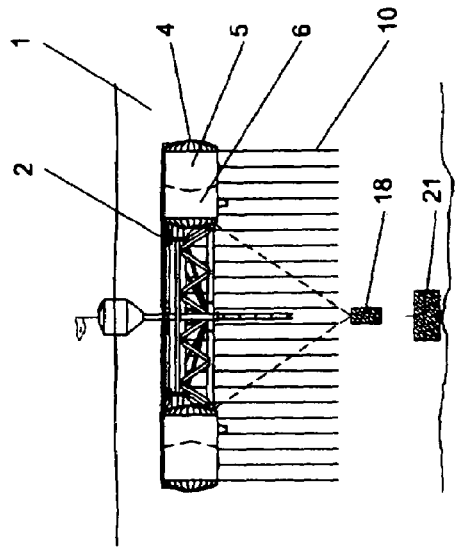
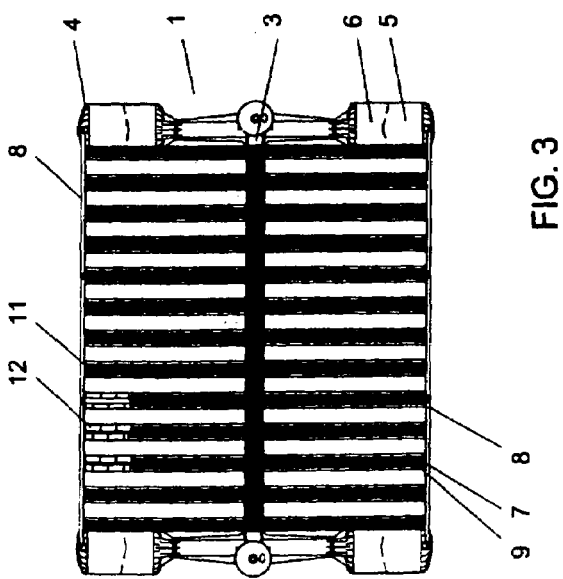
FIG. 1
FIG. 2
FIG. 3

SUBMERSIBLE FARM

TECHNICAL AREA

The invention refers to an improved submersible farm, especially designed for the growth of mussels and other molluscs in the open sea, comprised of a carrier frame that can be anchored to the sea bed and raised from this by means of floats and autonomous traction units.

HISTORY OF THE INVENTION

In the conventional mollusc farming systems in frames envisaged for calm waters, material is generated, which, in high concentrations disturb and destabilise the eco-system. This environmental pollution has a negative effect on the ecological balance, since it causes a reduction in the flow of plankton and reduces the feed of the molluscs, in turn reducing the production of the desired crop. In less calm waters and at various depths, there is a higher amount of nutrients, which is reflected in greater and quicker growth of the molluscs attached to the culture ropes that can be moved by the water. It is therefore desirable to install the farms in these waters or those in the immediate vicinity.

The document ES U 0273021 of Piñeiro is known, which describes a submersible farm for marine cultures composed of a horizontal structure, on which is located a grid that supports the culture ropes, made of tubes suitably arranged to form closed circuits destined to be filled with water when the farm needs to be lowered and from whose sides protrude vertical frames, also tubular, that determine a surface float for the farm. However, in rough water and despite the farm being slackly anchored, the culture ropes bear the sudden movements of the waves and the immersion or emersion of the submersible farm is also sudden, which causes undesired release of the molluscs and production losses. Access to the central ropes of the farm is also costly and complex. The increases in weight of the production can sink the farm and its load to the sea bed unless they are adequately monitored.

PURPOSE OF THE INVENTION

It is desirable, as has been stated, to design a submersible farm, immediately adaptable but without brusque changes to convenient working positions so that the mollusc remains firmly attached to the culture ropes and can open its shell without difficulty to receive and eliminate nutrients to ensure its rapid growth.

Another purpose of the invention is to ensure that maintenance and labour in the farm are carried out quickly and simply, with a production cost less than that achieved in conventional farms.

It is also an aim of the invention to provide automatic governance and control of the farm as well as providing a layout that ensures it stabilisation.

DESCRIPTION OF THE INVENTION

According to the invention, the submersible farm for growing rearing molluscs is composed of a self-supporting frame formed by a main flotation structure of "H" section, made of floating tubular elements joined together in a leak-proof manner to give a flotation displacement additional to that provided by the main floats fixed to the ends of the structure and that, arranged in an ordered manner on the structure, there are several projecting beams with lateral support arms to support the culture ropes and a guide support for the sliding of the barrows used to gather the production.

In substance, the structure is guided in its vertical displacements to which it is subjected by tides or the weight of the culture by surface buoys also called beacon boys or support buoys, comprising a main float body and a descending tube which includes, at least on its lower part, a stop that limits its sliding towards the bottom of the structure. To enable a better retention of the structure in the surface buoys, it is possible to design the descending tube from the guide of the surface buoys with two sliding stops, for example upper and lower previously fixed or, at least the lower adjustable along the length of the of the tube and the upper designed to coincide with the base of the main flotation of the buoy or close to it and also movable along the length of the tube.

The invention envisages the installation of level sensors in the floats and the beacon buoys that detect the inclination of the frame and transmit it to a programmable robot that automatically controls and corrects the flotation level, activating the electro-valves that inject or extract air from the system. Their location allows the processes and movements of the farm to be controlled by means of a mobile telephone control, e.g., GSM or, if desired, this control may be blocked so as to carry out control by means of the automatic electronic system.

The invention moreover envisages a system of stabilisation of the farm between depths that consists of pulleys and traction cables placed between the frame and the concrete mooring points.

DESCRIPTION OF THE DRAWINGS

As an example, the accompanying drawings show a preferred execution of the improved submersible farm according to the invention.

FIG. 1 is a front elevation of the improved submersible farm.

FIG. 2 is a side elevation of the improved submersible farm.

FIG. 3 is a plan elevation of the improved submersible farm.

PREFERRED EXECUTION OF THE INVENTION

In accordance with the example and as is shown on the drawings, the self-supporting frame (1) of the farm shows a main flotation structure (2) in "H" section joined in a leak-proof manner, made from steel with a high elastic limit so that the torsion to which they are subjected is not permanent, with tubular elements (3) and main floats (4) at the ends of the "H" joined in a leak-proof fashion. In the proposed example, each tubular element (3) of the structure in "H" shows its ends closed, adding a further volume to that already existing with the main floats (4). The joint between the tubular elements (3), of the "H" structure to each other and to the floats (4) is made by flanges and screws that simplify assembly and transport of the structure, although it could be achieved with welded anchorings.

As may be better appreciated in FIG. 2, the "H" structure (2) bears crossing its central column, protruding beams (7) on which are supported side bars (8), which, joined to the two floats (4), close the perimeter of the structure, make it more rigid serve as support and fender for boats. The beams (7) have supporting side arms (9) for the culture ropes (10) suitably sized and separated from each other to allow the sea current to pass with its supply of nutrients for the species to be grown as well as allowing the support of a cable or fibre bar to be used to hang the culture ropes (10) that are to be subsequently collected and, in the supposition that, due to the width of the structure, the central culture ropes (10) could not be reached by the boat's crane or basket, would serve as slide rails for a barrow or platform into which the operator would transfer them to move them as close as possible to the structure (2). On the central column of the "H" shaped structure, grids or hand rails (12) are installed allowing the operator to pass to all parts of the "H" shaped structure (2) on its surface to carry out maintenance and labour.

Each tubular stretch of the "H" shaped structure (2), at whose ends the main floats (4) are fitted, has, arranged centrally and vertically, a tube with anti-friction bushes in its interior sized for the guide tube (15) to be able to slide in it, This begins at its lower end in the flotation body (14) of the beacon buoy (13) to indicate the start and finish of the immersion, on submerging the farm in production or collaborating in raising the "H" shaped structure to the surface when it emerges for gathering or labour.

This guide tube (15), whose size and strength depends on waves, currents, winds etc. and whose length will be equal to the maximum immersion required by the structure (2), incorporates, as can be appreciated in FIGS. 1 and 3, a lower depth stop (16) that limits the depth to which the structure (2) can slide and may be set at different heights depending on where it is inserted in the holes arranged along the length of the guide tube (15), when so required. Upwards, close to or coinciding with the lower base of the flotation body (14) of the beacon buoy (13), the guide tube (15) has an upper stop (17) that limits the elevation of the "H" shaped structure (2). When using the beacon buoy (13) as depth stop, its buoyancy forces the structure (2) to be maintained between the stops (16) and (17) with the variations of tide, with the additional advantage that the product will not suffer the pressure or temperature changes as well as reducing environmental impact. The beacon buoys (13) house connecters, hoses and connection valves to the motors and auxiliary machinery for the automatic or manual functioning of the farm, which may also be arranged in it or in a support vessel.

In accordance with the invention and according to the drawings, the main floats (4), joined in pairs to the "H" shaped structure (2) are cylindrical in shape and sized depending on the combined weight of the and size of the farm and the type of crop. Each float (4) has a first pressure compartment (5) and a second compartment or ballast tank (6). The first pressure tank (5) houses a reservoir of compressed air and incorporates connection, hoses and other accessories to facilitate its inlet or outlet. The volume of air present in the group of floats is approximately that necessary to support the weight of the farm and the weight of its product. The second compartment or ballast tank (6) has a lower opening for water to enter or be expelled so as to collaborate in the immersion or emersion of the farm. Injecting pressurised air into the float to displace the water ballast or venting it to the atmosphere to allow water to enter the ballast tank (6) to regulate the depth or the lifting of the farm to the surface for collection or labour is carried out by means of a pneumatic hose connected to the sealed pressure compartment (5) of the float (4). The floats (4) are mounted on the "H" shaped structure (2) in such a way that the pressure compartments (5) are towards the outside. A compressor fitted in the beacon buoy (13) or in an auxiliary vessel will supply the air needed to compensate the pressure losses in the farm, while a common manifold and various lengths of pneumatic tubing connected to each float (4) avoid and correct the heeling, equalising the pressure in all the floats (4).

In accordance with the invention, the floats (4) and the beacon buoy (13) incorporate sensors (not illustrated) that detect the heeling and level variations of the farm and transmit them to the processor, which orders the appropriate valves to inject or, where applicable, to vent the air successively to correct the floatation level.

The processes and movements of the farm are also controlled by means of a hand-held PDA with a GSM module connected to the processor of the farm. More explicitly, by means of the PDA, commands can be sent to the processor of the farm, for example, to raise or lower each float (4) independently and regulated by the farm administrator, change from manual control mode to automatic mode or vice versa, add data and request reports control the farm lighting and the system alarms by sending the administrator messages, e.g., by SMS.

From each float (4), there hangs an auxiliary counter weight (18) whose weight depends on the floatation power, size and shape of the float (4). This weight has the purpose of lowering the centre of gravity of the farm and assist in its stabilisation, keeping the floats (4) balanced and in an operational position avoiding undesired heeling. It also serves as a possible element of security against the total sinking of the structure (2), since if a loss of pressure occurs in the floats (4), the water floods them, causing the sinking of the farm and its production. However, the sinking of the farm is detained on resting on the counterweights (18), on the sea bed, as the lifting force of sealed compartments (5) of the floats (4) is equal to the force of the weight of the counterweights (18), which is sufficient to keep the structure floating at an intermediate level. In the event of undesired sinking of the farm and once the stabilising counterweights (18) reach the sea bed, avoiding the culture ropes (10) touching it, a valve centred on the "H" shaped structure allows activation by a diver to transfer air from the pressure tanks (5) to the ballast tanks (6), quickly raising the farm to the surface.

The invention also envisages a mid-water stabilisation system of the farm composed of pulleys (19) and traction cables (20) arranged between the frame and the concrete mooring points (21).

In the main floats (4), the passage of air from the sealed compartment (5) to the flood chamber comprising the ballast tank (6) causes a pressure increase and the expulsion of water ballast so that the "H" shaped structure (2) of the frame (1) emerges from the water, sliding up the guide tube (15) of the beacon buoy (13). In order to sink the "H" shaped structure (2), the air valves of the ballast tanks (6) are opened, causing pressure to be lowered in their interior and allowing water to enter. On reaching the point where the weight is greater than the buoyancy of the floats, the structure (2) submerges, guided by the tube (15) of the guide buoy (13) until the depth set by the lower stop (16).

The repeated oscillations to which the farm is subjected in its vertical movements for its appropriate positioning do not cause the molluscs to be released.

The invention claimed is:

1. A submersible farm comprising (1) a self-supporting frame which is anchorable to a sea bed and submerged and raised with respect to the sea bed by floats and traction elements, (2) surface buoys which guide vertical placement of the self-supporting frame; and (3) a main flotation body having a descending guide tube that extends vertically with respect to the frame and has a lower depth stop that limits displacement of a respective surface buoy; wherein the main flotation body is "H"-shaped and includes ballasted floats at each end thereof, with each of said ballasted floats comprising a tubular element including a sealed reserve compressed air chamber for assisting in supporting the frame and a load thereof; and wherein each of said buoys and each of said floats includes a level sensor that detects changes in inclination of the frame and transmits said changes to a programmable robot that automatically corrects and controls flotation level of the farm by activating corresponding electro-valves that inject air into or vent air from said floats.

2. The submersible farm according to claim 1, wherein the programmable robot is operated by a hand-held computer.

* * * * *